(12) United States Patent  
Tanaka (10) Patent No.: US 8,233,170 B2  
(45) Date of Patent: Jul. 31, 2012

(54) IMAGE PROCESSING APPARATUS AND NON-TRANSITORY COMPUTER-READABLE STORAGE MEDIUM FOR STORING AN OPERATION CONTROL PROGRAM CAPABLE OF CONTROLLING PREVENTING IMAGE DATA TO BE OUTPUTTED

(75) Inventor: Kunihiko Tanaka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 862 days.

(21) Appl. No.: 12/357,759

(22) Filed: Jan. 22, 2009

(65) Prior Publication Data

US 2009/0262390 A1    Oct. 22, 2009

(30) Foreign Application Priority Data

Apr. 17, 2008    (JP) .................................. 2008-108178

(51) Int. Cl.
*G06F 15/00*    (2006.01)
*G06K 1/00*    (2006.01)
*G06K 15/00*    (2006.01)
*H04N 1/407*    (2006.01)

(52) U.S. Cl. ...................................... 358/1.14; 358/3.27
(58) Field of Classification Search ........................ None
See application file for complete search history.

(56) References Cited

U.S. PATENT DOCUMENTS

| 7,039,215 B2 | 5/2006 | Suzuki |
| 8,029,084 B2 * | 10/2011 | Uchiyama et al. ............. 347/19 |
| 2008/0232639 A1 * | 9/2008 | Ishikawa et al. .............. 382/100 |

FOREIGN PATENT DOCUMENTS

JP    2003-101762    4/2003

* cited by examiner

*Primary Examiner* — Douglas Tran
(74) *Attorney, Agent, or Firm* — K&L Gates LLP (57) ABSTRACT

Devices and methods wherein if a predefined recognition dot pattern designed to prohibit an image data outputting is detected from image data acquired by an image data acquiring unit, outputting of the image data is prohibited, and if a predefined recognition mark to cancel image data outputting prohibition is detected, the outputting of the image data is permitted.

9 Claims, 6 Drawing Sheets

IMAGE PROCESSING APPARATUS AND NON-TRANSITORY COMPUTER-READABLE STORAGE MEDIUM FOR STORING AN OPERATION CONTROL PROGRAM CAPABLE OF CONTROLLING PREVENTING IMAGE DATA TO BE OUTPUTTED

INCORPORATION BY REFERENCE

This application is based upon and claims the benefit of priority from the corresponding Japanese Patent Application No. 2008-108178, filed Apr. 17, 2008, the entire contents of which is incorporated herein by reference.

FIELD OF THE INVENTION

The present invention relates to an image processing apparatus and a computer-readable storage medium for storing an operation control program, more particularly to technology for controlling preventing image data to be outputted.

BACKGROUND

It is known to provide an image forming apparatus capable of preventing unauthorized individuals from reading or printing certain documents, e.g., a confidential document. For example, there are image forming apparatuses using copy-forgery-prohibited pattern image processing technology that allow characters to appear in the background of an image when the document is copied. Using this technology, extremely small dots existing on the document disappear when the image is read to embed latent characters such as "COPY" or "DO NOT COPY" in the background of a confidential document. This can be achieved by the use of two areas including a latent image portion formed of a group of small dots and a background portion formed of a group of large dots, thereby allowing those characters to appear when copying the confidential document.

There is also known an image forming apparatus employing a copy guard technology in which a special dot pattern is embedded in the background of the confidential document or the like when outputted. The outputting of the image data is prevented when the special dot pattern is detected when the document image is read at the time of copying thereof.

It is also known to employ a technology combining the above-mentioned two technologies. For example, a technology for forming the background portion (area that does not disappear at the time of the copying) used for a copy-forgery-prohibited pattern image processing with the special dot pattern to which the copy guard technology is applied. This technology allows a copying machine that is capable of detecting the special dot pattern to prevent the illegal copying, as well as, even with respect to a copying machine incapable of detecting the special dot pattern to cause the above-mentioned latent characters to appear on the copy, thereby suppressing the use by a fraudulent third party.

SUMMARY

An image processing apparatus according to an embodiment of the present invention includes:
an image data acquiring unit for acquiring image data;
a dot pattern detecting unit for determining whether the image data acquired by the image data acquiring unit includes a predefined recognition dot pattern designed to prohibit an outputting of the image data or not;
a recognition mark to cancel an image data outputting prohibition detecting unit for determining whether the image data acquired by the image data acquiring unit includes a predefined recognition mark to cancel an image data outputting prohibition or not;
and
a control unit for prohibiting outputting of the image data if the dot pattern detecting unit detects the recognition dot pattern designed to prohibit an image data outputting, and permitting the outputting of the image data if the recognition mark to cancel an image data outputting prohibition detecting unit detects the recognition mark to cancel an image data outputting prohibition.

Additional features and advantages are described herein, and will be apparent from the following Detailed Description and the figures.

BRIEF DESCRIPTION OF THE FIGURES

In the accompanying drawings.

DETAILED DESCRIPTION

An image processing apparatus and a computer-readable storage medium for storing an operation control program according to an embodiment of the present invention will now be described. Note that by way of example, and not limitation, the image forming apparatus illustrated in this embodiment a copying machine. Other examples of the image forming apparatus may include a multifunction peripheral having the functions of a copying machine, a scanner, a facsimile, a printer, and the like.

Figure 1:
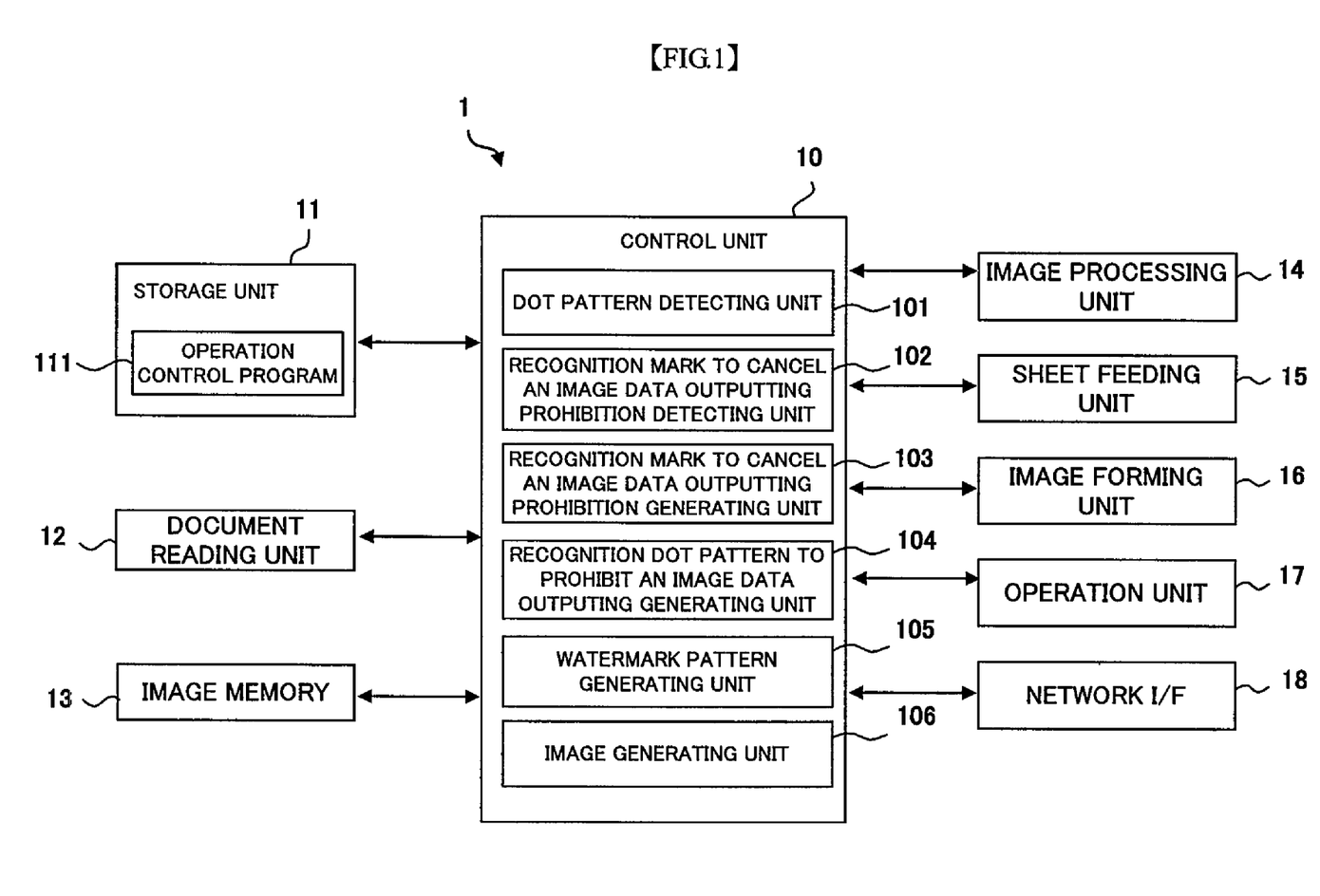
FIG. 1 is a functional block diagram illustrating an electrical configuration of a copying machine according to an embodiment of the present invention.

FIG. 1 is a functional block diagram illustrating a configuration of a copying machine 1. FIGS. 2A to 2C are diagrams illustrating a background image subjected to a copy-forgery-prohibited pattern image processing. The copying machine 1 includes a control unit 10, a storage unit 11, a document reading unit 12, an image memory 13, an image processing unit 14, a sheet feeding unit 15, an image forming unit 16, an operation unit 17, and a network I/F 18.

The control unit 10 includes, for example, a central processing unit (CPU), and serves to control an overall operation of the copying machine 1. Further, the control unit 10 includes a dot pattern detecting unit 101, a recognition mark to cancel an image data outputting prohibition detecting unit 102, a recognition mark to cancel an image data outputting prohibition generating unit 103, a recognition dot pattern designed to prohibit an image data outputting generating unit 104, a watermark pattern generating unit 105, and an image generating unit 106.

The control unit 10 can function as each of the dot pattern detecting unit 101, a recognition mark to cancel an image data outputting prohibition detecting unit 102, a recognition mark to cancel an image data outputting prohibition generating unit 103, a recognition dot pattern designed to prohibit an image data outputting generating unit 104, the watermark pattern generating unit 105, and the image generating unit 106 according to an inputted instruction signal or the like based on the operation control program stored in the storage unit 11 according to the embodiment of the present invention. Or the control unit 10 may be provided with those components, each of which can be implemented by a circuit or the like.

The dot pattern detecting unit 101 determines whether a recognition dot pattern designed to prohibit an image data outputting is included in the data on the document image that is read by the document reading unit 12 or image data acquired by the network I/F 18 from a computer or the like that is connected to the copying machine 1 via a network. For example, the dot pattern detecting unit 101 stores a dot pattern having a predetermined screen ruling and screen angle for the halftone dot image as a recognition dot pattern that indicates that outputting of image data including the halftone dot image area representing the dot pattern is prohibited. The dot pattern detecting unit 101 determines whether the image data acquired by the document reading unit 12 or the network I/F 18 includes the dot area or not. And if the screen ruling and screen angle for the halftone dot image of the dot area match the screen ruling and screen angle for the halftone dot image of the recognition dot pattern designed to prohibit an image data outputting, detects that the recognition dot pattern designed to prohibit an image data outputting is included in the image data.

When the dot pattern detecting unit 101 detects the recognition dot pattern designed to prohibit an image data outputting from the image data acquired by the document reading unit 12 or the network I/F 18 by the image forming unit 16, the control unit 10 prevents the image formation to which the data was to be subjected by the image forming unit 16 (so-called copy guard technology). If the dot pattern detecting unit 101 does not detect the recognition dot pattern designed to prohibit an image data outputting, it permits the image formation to be performed by the image forming unit 16.

The recognition mark to cancel an image data outputting prohibition detecting unit 102 determines whether a predefined recognition mark, to cancel an image data outputting prohibition (described later in detail), is included in the image data acquired by the document reading unit 12 or the network I/F 18 or not.

The recognition mark to cancel an image data outputting prohibition generating unit 103 generates the necessary recognition mark with the image data acquired by the document reading unit 12 or the network I/F 18.

The recognition mark to cancel an image data outputting prohibition may be either a predefined image or a dot pattern having a predefined screen ruling and screen angle for the halftone dot image (different from those of the outputting prohibition dot pattern). Note that the recognition mark to cancel an image data outputting prohibition generating unit 103 and the image generating unit 106 are an example of an recognition mark to cancel an image data outputting prohibition compositing unit. The data necessary to generate the above-mentioned recognition mark to cancel an image data outputting prohibition can be previously stored by the storage unit 11 or the recognition mark to cancel an image data outputting prohibition unit 103.

The recognition dot pattern designed to prohibit an image data outputting generating unit 104 generates the recognition dot pattern data with the image data acquired by the document reading unit 12 or the network I/F 18. The recognition dot pattern designed to prohibit an image data outputting generating unit 104 stores, for example, information on the predefined screen ruling and screen angle for the halftone dot image representing the above-mentioned recognition dot pattern designed to prohibit an image data outputting, and generates the dot pattern having the screen ruling and screen angle for the halftone dot image as the background image.

Note that the recognition dot pattern designed to prohibit an image data outputting generating unit 104 and the image generating unit 106 are an example of a recognition dot pattern designed to prohibit an image data outputting compositing unit according to the present invention. Further, data necessary to generate the above-mentioned a recognition dot pattern designed to prohibit an image data outputting is previously stored by the storage unit 11 or the dot pattern to prohibit an image data outputting generating unit 104.

The watermark pattern generating unit 105 embeds a watermark pattern (electronic watermark information or latent image) using the image data acquired by the document reading unit 12 or the network I/F 18.

The watermark pattern can be embedded as a latent image into the background image using the image data acquired by the document reading unit 12 or the network I/F 18. For example, the watermark pattern generating unit 105 can use a dither pattern different in kind from the other background part for a latent image part constituting the watermark pattern, and sets one pattern density exceeding a resolution that is used when the document reading unit 12 reads a document and another pattern density to a pattern density equal to or lower than the resolution used when the document reading unit 12 reads the document.

Even if an original of the document (on which an image embedded with the watermark pattern is formed) is looked at, it is hard for the human eye to recognize the electronic watermark information. However, if an image of the original of the document, which is printed out by the image forming unit 16, is optically read by the document reading unit 12, for example, the control unit 10 can discriminate the electronic watermark information from the read image.

Accordingly, in a situation where the document including the background image embedded with the watermark pattern is copied by the copying machine 1, it is possible to cause a pattern formed with the watermark pattern (for example, FIG. 2C) to appear on a recording sheet on which the image of the copy material is formed. Note that data necessary to create the watermark pattern can be previously stored by the watermark pattern generating unit 105. Note that the watermark pattern generating unit 105 and the image generating unit 106 are examples of a watermark pattern compositing unit according to the present invention.

The image generating unit 106 performs a processing of overlaying the background image (FIG. 2B) generated by the recognition mark to cancel an image data outputting prohibition generating unit 103, the recognition dot pattern designed to prohibit an image data outputting generating unit 104, and the watermark pattern generating unit 105 onto the image data (FIG. 2A) acquired by the document reading unit 12 or the network I/F 18 (FIG. 2C). Note that a detailed description thereof is omitted herein because an example of a method of generating a document image by overlaying a background image onto subject pixels is disclosed in JP 2003-101762 A.

The storage unit 11 stores programs, data, and the like that are used for implementing the various kinds of functions provided to the copying machine 1. In this embodiment, the storage unit 11 stores an operation control program 111, programs necessary for controlling the operation of the copying machine 1, and the like.

The document reading unit (image data acquiring unit) 12 reads the document using an image sensor such as a charge coupled device (CCD) sensor or a complementary metal oxide semiconductor (CMOS) sensor, and converts the read image into image data.

The image memory 13 temporarily stores the image data output from the document reading unit 12 and the image data transmitted from an external device via the network I/F 18. The image processing unit 14 subjects the image data stored in the image memory 13 to image correction, enlargement/reduction, or other such image processing. The sheet feeding unit 15 supplies a paper from a sheet feeding cassette one by one, and conveys the paper to the image forming unit 16.

The image forming unit 16 forms an image based on the image data stored in the image memory 13 on the paper. The operation unit (instruction inputting unit) 17 includes a display panel and various operation buttons. If an instruction is inputted by the user's operation of the operation unit 17, the unit outputs an operation signal to the control unit 10. The network I/F (image data acquiring unit) 18 includes a communication module such as a LAN board, and transmits/receives various kinds of data such as data to be printed to/from the external device (for example, computer) via a network (not shown) connected to the network I/F 18.

Figure 3:
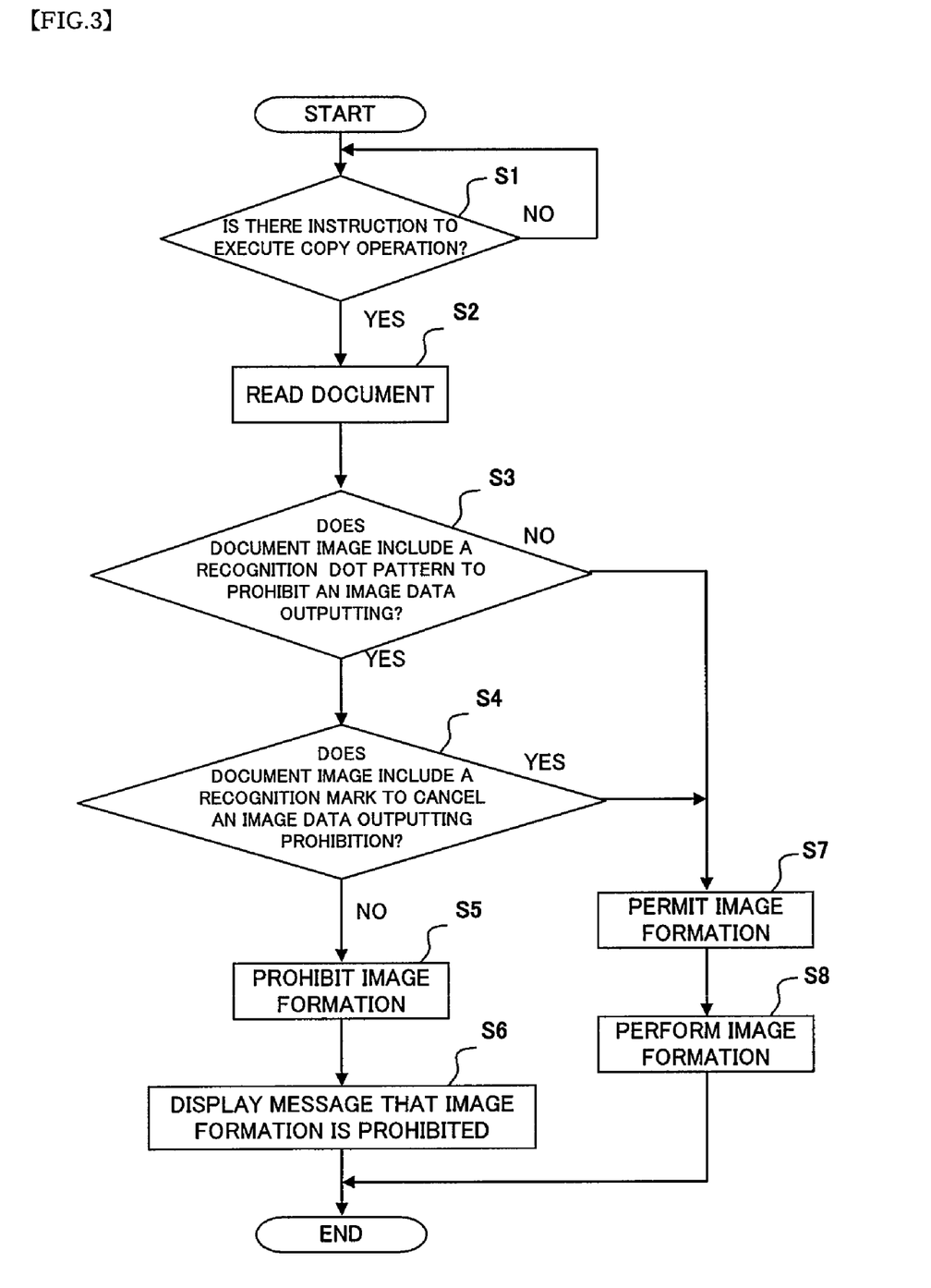
FIG. 3 is a flowchart illustrating a copy restriction process performed by the copying machine according to an embodiment of the present invention.

A copy restriction process performed by the copying machine 1 according to an embodiment of the present invention will now be described. FIG. 3 is a flowchart illustrating the copy restriction process performed by the copying machine 1 according to the embodiment.

When an instruction to execute a copy operation is inputted by the user's operation of the operation unit 17 (YES in Step S1), the control unit 10 causes the document reading unit 12 to read a document (S2). The dot pattern detecting unit 101 determines whether the document image read by the document reading unit 12 includes a recognition dot pattern designed to prohibit an image data outputting (S3) or not. In other words, the dot pattern detecting unit 101 determines whether there exists a halftone dot image area in the document image read by the document reading unit 12, and if the halftone dot image area exists, the dot pattern detecting unit 101 detects the screen ruling and screen angle for the halftone dot image of the halftone dot image area or not, and determines whether the detected screen ruling and screen angle for the halftone dot image match the screen ruling and screen angle for the halftone dot image of the recognition dot pattern designed to prohibit an image data outputting that is stored in the storage unit 11 as prohibiting copying or not.

Herein, if the dot pattern detecting unit 101 determines that the above-mentioned document image does not include the recognition dot pattern designed to prohibit an image data outputting (NO in Step S3), in other words, if there exists no halftone dot image area in the document image, or if the screen ruling and screen angle for the halftone dot image do not match the screen ruling and screen angle for the halftone dot image of the above-mentioned subject of copy prohibition, the control unit 10 permits the image forming unit 16 to form the image for the document (S7), and causes the image forming unit 16 to perform the image formation for the document image (S8).

On the other hand, if the dot pattern detecting unit 101 determines that the document image includes the recognition dot pattern designed to prohibit an image data outputting (YES in Step S3), in other words, if the screen ruling and screen angle for the halftone dot image of the halftone dot image area included in the document image match the screen ruling and screen angle for the halftone dot image of recognition dot pattern designed to prohibit an image data outputting that indicates the copy prohibition, the recognition mark to cancel an image data outputting prohibition detecting unit 102 determines whether the document image includes a recognition mark to cancel an image data outputting prohibition (S4) or not. For example, if the recognition mark to cancel an image data outputting prohibition is set as a predetermined image, the recognition mark to cancel an image data outputting prohibition detecting unit 102 determines whether the document image includes pixels having such pixel values as to form the predetermined image constituting the recognition mark to cancel an image data outputting prohibition or determines, in addition to that, whether an image whose area or the like coincides with that of the predetermined image or not. Alternatively, if the recognition mark to cancel an image data outputting prohibition is set as a halftone dot image area having a predetermined screen ruling and screen angle for the halftone dot image, the recognition mark to cancel an image data outputting prohibition detecting unit 102 determines whether the document image includes the screen ruling and screen angle for the halftone dot image of the halftone dot image area as the recognition mark to cancel an image data outputting prohibition or determines, in addition to that or not, whether a halftone dot image area whose area or the like coincides with that of the halftone dot image area or not.

Herein, if the recognition mark to cancel an image data outputting prohibition detecting unit 102 determines that the document image includes the recognition mark to cancel an image data outputting prohibition (YES in Step S4), the control unit 10 permits the image forming unit 16 to perform the image formation for the document image (S7), and causes the image forming unit 16 to perform the image formation for the document image (S8). In other words, if the document image includes the recognition mark to cancel an image data outputting prohibition, even in the case where it is determined in Step S3 that the document image includes the recognition dot pattern designed to prohibit an image data outputting, the control unit 10 permits the image formation for the document image.

Alternatively, herein, if the recognition mark to cancel an image data outputting prohibition detecting unit 102 determines that the document image does not include the recognition mark to cancel an image data outputting prohibition (NO in Step S4), the control unit 10 prohibits the image forming unit 16 from performing the image formation for the document image (S5), and displays a message to the effect that the image formation for the document image is prohibited onto a display unit constituted of a liquid crystal display (LCD) or the like provided to the operation unit 17 (S6).

According to the above-mentioned series of processes, with regard to image data including the recognition dot pattern designed to prohibit an image data outputting and image data involving both an recognition dot pattern designed to prohibit an image data outputting embedding process and a copy-forgery-prohibited pattern image processing, it is possible to ensure the security of the image data that does not include the recognition mark to cancel an image data outputting prohibition by prohibiting the outputting thereof (for example, copying of a printed matter). Meanwhile, since the outputting of the image data that includes the recognition mark to cancel an image data outputting prohibition is permitted, with regard to the copying of the image including the recognition mark to cancel an image data outputting prohibition, in a case where the image having the background image subjected to the copy guard technology is copied by the copying machine 1, the user can confirm whether the latent characters appear on the copied recording sheet.

Figure 4:
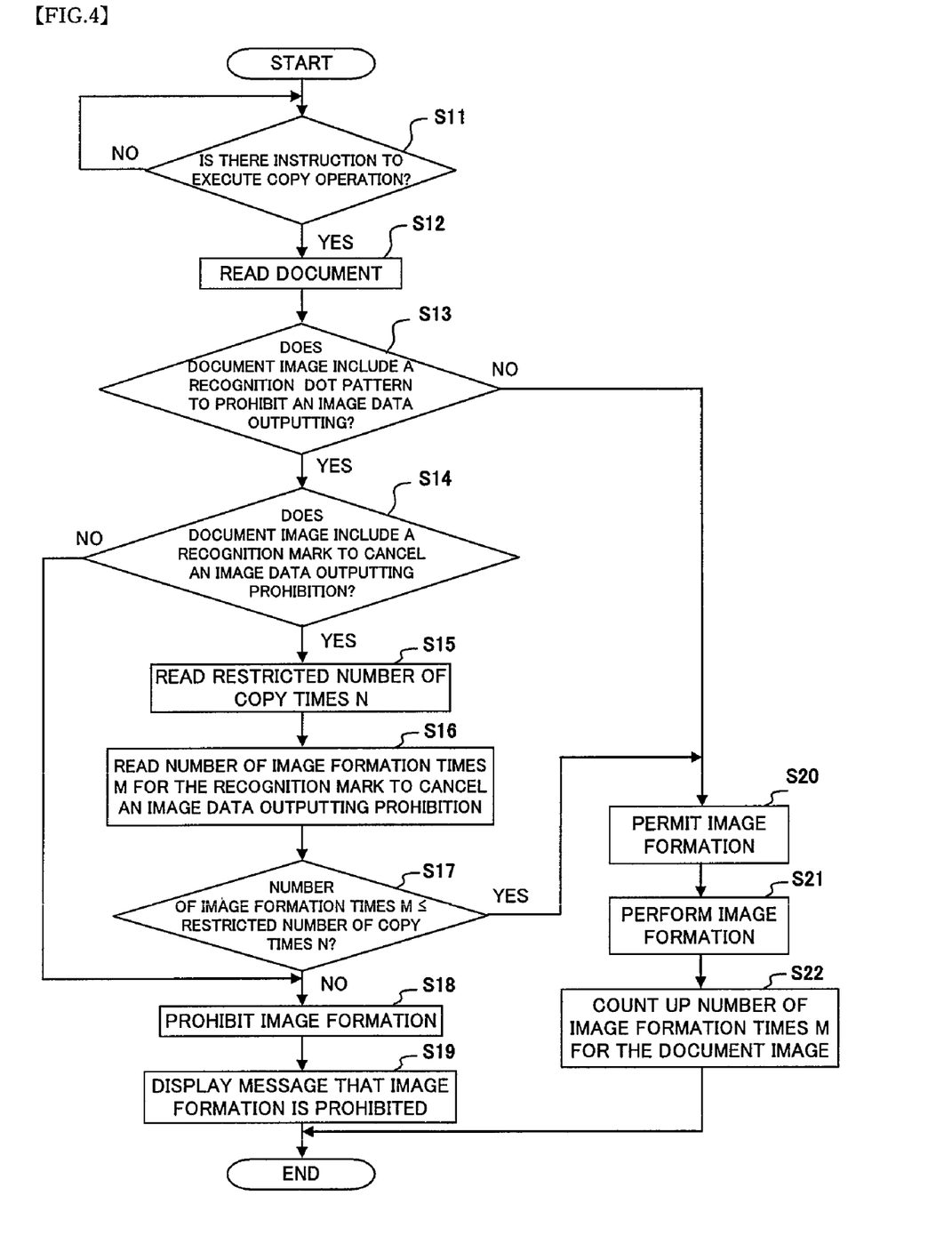
FIG. 4 is a flowchart illustrating a copy restriction process performed by the copying machine according to another embodiment of the present invention.

A copy restriction process performed by the copying machine 1 according to another embodiment of the present invention will now be described. FIG. 4 is a flowchart illustrating the copy restriction process performed by the copying machine 1 according to this embodiment. Note that the description of the same process as that of the previous embodiment illustrated in FIG. 3 is omitted.

In the embodiment, the control unit 10 or the storage unit 11 stores a permitted number of copy times for each recognition mark to cancel an image data outputting prohibition. In a case where the instruction to execute the copy operation is inputted by the user's operation of the operation unit 17, when the recognition mark to cancel an image data outputting prohibition detecting unit 102 detects the recognition mark to cancel an image data outputting prohibition from the document image, the control unit 10 permits the formation of the image for the document as long as the number of copy times for the document image is within the number of copies that is permitted for the recognition mark to cancel an image data outputting prohibition.

In other words, if the dot pattern detecting unit 101 determines that the document image includes the recognition dot pattern designed to prohibit an image data outputting (YES in Step S13), and if the recognition mark to cancel an image data outputting prohibition detecting unit 102 determines that the document image includes the recognition mark to cancel an image data outputting prohibition (YES in Step S14), the control unit 10 reads a restricted number of copy times N that is permitted for the detected recognition mark to cancel an image data outputting prohibition (S15).

Then, the control unit 10 reads a number of image formation times M at which the image of the document image including the recognition mark to cancel an image data outputting prohibition has already been created, the number of image formation times M being stored in the control unit 10 or the storage unit 11 (S16). If the number of image formation times M≦the restricted number of copy times N (YES in Step S17), the control unit 10 permits the image forming unit 16 to perform the image formation for the document image (S20), and causes the image forming unit 16 to perform the image formation for the document image (S21). After that, the control unit 10 sums up the number of image formation times M for the document image including the recognition mark to cancel an image data outputting prohibition (S22).

On the other hand, if it is determined in Step S17 that the number of image formation times M is not equal to or smaller than the restricted number of copy times N (NO in Step S17), in other words, if the number of image formation times M exceeds the restricted number of copy times N, the control unit 10 prohibits the image forming unit 16 from performing the image formation for the document image including the recognition mark to cancel an image data outputting prohibition (S18).

Accordingly, it is possible to effectively prevent an unauthorized third party from attempting to copy the document without limitation or that the outputting prohibition is circumvented by pasting the recognition mark to cancel an image data outputting prohibition within the image onto another image embedded with the recognition dot pattern designed to prohibit an image data outputting.

Figure 5:
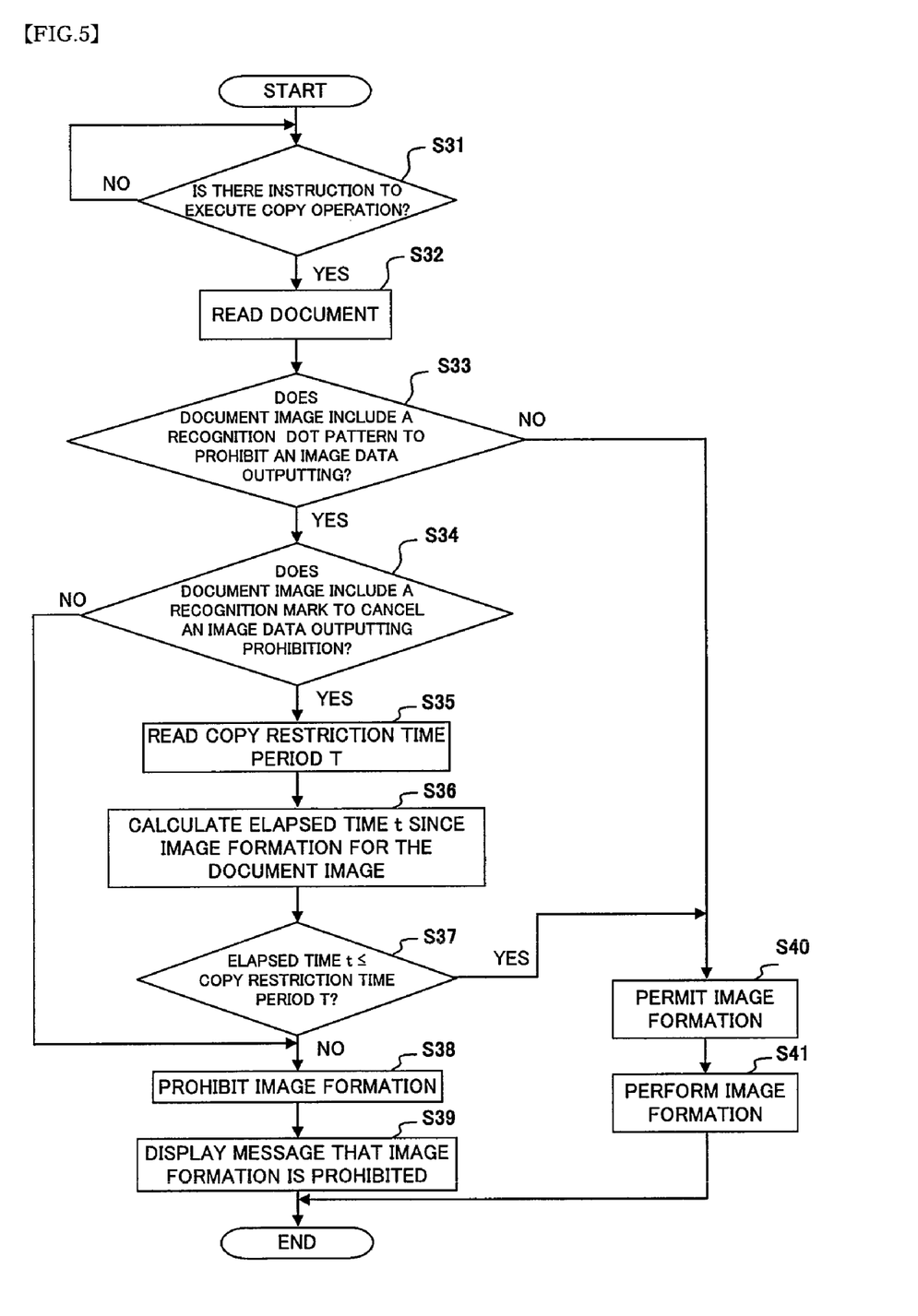
FIG. 5 is a flowchart illustrating a copy restriction process performed by the copying machine according to a further embodiment of the present invention.

A copy restriction process performed by the copying machine 1 according to a further embodiment of the present invention will now be described. FIG. 5 is a flowchart illustrating the copy restriction process performed by the copying machine 1 according to this embodiment. Note that the description of the same process as that of the previous embodiments illustrated in FIG. 3 or FIG. 4 is omitted.

In the embodiment, the control unit 10 or the storage unit 11 stores a copy restriction time period T (for example, units of 10 minutes or 1 week), during which the copying thereof is permitted, for each recognition mark to cancel an image data outputting prohibition. The copy restriction time period T starts at the time at which the image of the document image including each recognition mark to cancel an image data outputting prohibition is created. In the case where the instruction to execute the copy operation is inputted by the user's operation of the operation unit 17, when the recognition mark to cancel an image data outputting prohibition detecting unit 102 detects the recognition mark to cancel an image data outputting prohibition from the document image, the control unit 10 permits the image formation for the document image as long as an elapsed time t since the image formation for the document image is within the copy restriction time period T.

In other words, if the dot pattern detecting unit 101 determines that the document image includes the recognition dot pattern designed to prohibit an image data outputting (YES in Step S33), and if the recognition mark to cancel an image data outputting prohibition detecting unit 102 determines that the document image includes the recognition mark to cancel an image data outputting prohibition (YES in Step S34), the control unit 10 reads the copy restriction time period T that is permitted for the detected recognition mark to cancel an image data outputting prohibition (S35).

Then, the control unit 10 reads information on the time when the image of the document image including the recognition mark to cancel an image data outputting prohibition is formed, the time being stored in the control unit 10 or the storage unit 11. Then the unit 10 refers to an internal timer to calculate the time period from the time of the image formation until the time at which the instruction to execute the copy operation for the document image is inputted in Step S31. In other words, the elapsed time t since the image formation for the document image (S36) is calculated. In this embodiment, upon the image formation for the document image including the recognition mark to cancel an image data outputting prohibition, the copying machine 1 stores the information on the time at which the image is formed in the control unit 10 or the storage unit 11.

If the elapsed time t is less than or equal to the copy restriction time period T (YES in Step S37), the control unit 10 permits the image forming unit 16 to perform the image formation for the document image (S40), and causes the image forming unit 16 to perform the image formation for the document image (S41).

On the other hand, if it is determined in Step S27 that the elapsed time t is not less than or equal to the copy restriction time period T (NO in Step S37), in other words, if the elapsed time t exceeds the copy restriction time period T, the control unit 10 prohibits the image forming unit 16 from performing the image formation for the document image including the recognition mark to cancel an image data outputting prohibition (S38).

Accordingly, it is possible to effectively prevent using the image formation permitted period, an unauthorized third party from copying the document without limitation or from pasting a recognition mark to cancel an image data outputting prohibition from the image of one document onto another.

Figure 6:
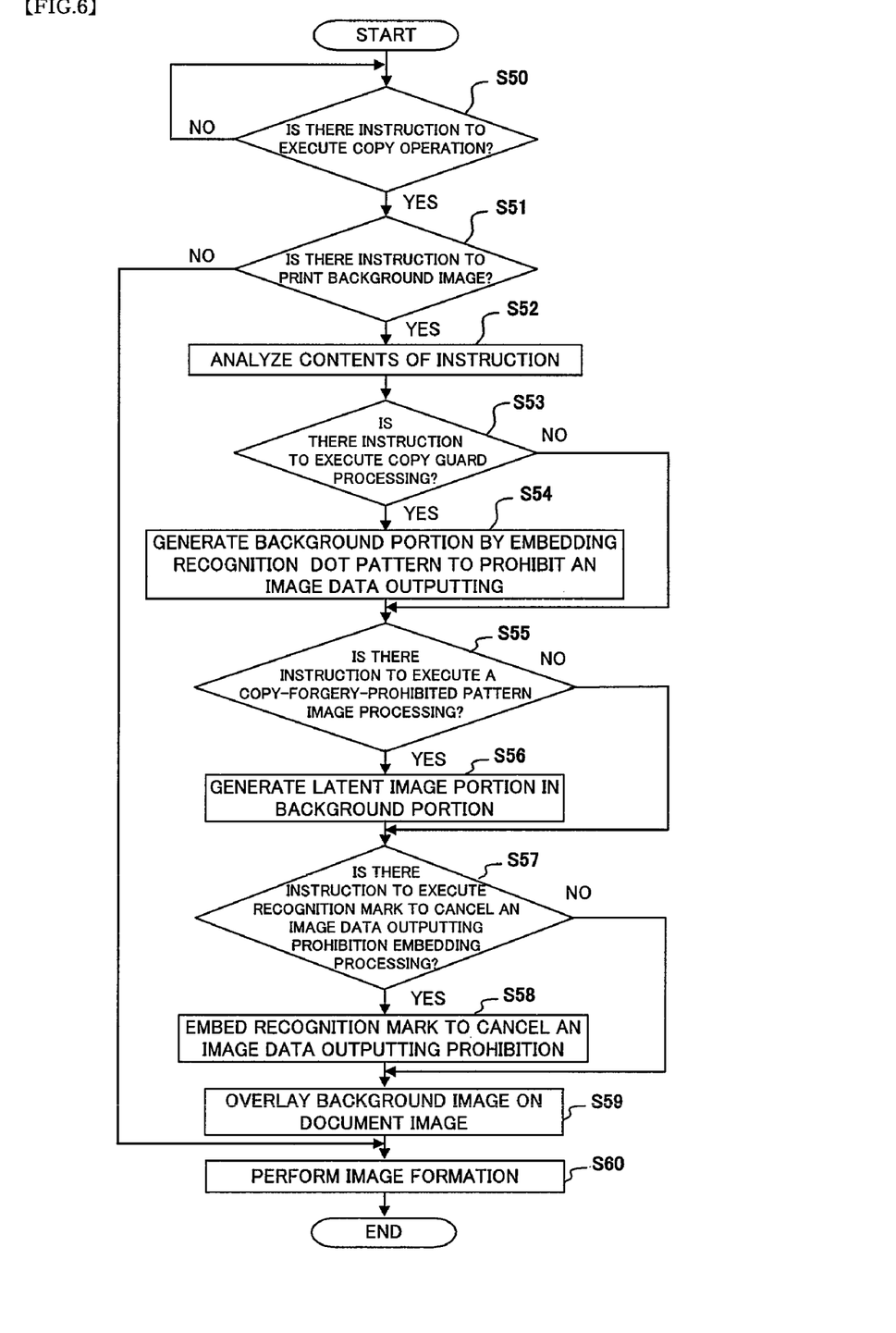
FIG. 6 is a flowchart illustrating the copy-forgery-prohibited pattern image processing and a recognition mark to cancel an image data outputting embedding processing that are performed by the copying machine.

The copy-forgery-prohibited pattern image processing and the recognition mark to cancel an image data outputting prohibition embedding process that are performed by the copying machine 1 will now be described. FIG. 6 is a flowchart illustrating the copy-forgery-prohibited pattern image and a recognition mark to cancel an image data outputting prohibition embedding process that are performed by the copying machine.

When an instruction to execute a copy operation is inputted by the user's operation of the operation unit 17 (YES in Step S50), it is determined whether an instruction to print a background image has been inputted by the user's operation of the operation unit 17 or not (S51). If the instruction to print the background image has not been inputted by the user (NO in Step S51), the control unit 10 causes the image forming unit 16 to form the image of the document image as is, without the background image (S60).

Herein, if the instruction to print the background image has been inputted by the user (YES in Step S51), the control unit 10 analyzes the contents of the instruction to print the background image (S52). In other words, the control unit 10 determines which execution is requested by the instruction to print the background image, the execution of the copy guard process, the execution of the copy-forgery-prohibited pattern image process, or the execution of the recognition mark to cancel an image data outputting prohibition embedding process.

If the control unit 10 determines that the instruction to print the background image requests the execution of the copy guard process (YES in Step S53), the recognition dot pattern designed to prohibit an image data outputting generating unit 104 generates the background image formed of the halftone dot image area having the screen ruling and screen angle for the halftone dot image predefined as the recognition dot pattern designed to prohibit an image data outputting (S54).

Figure 2:
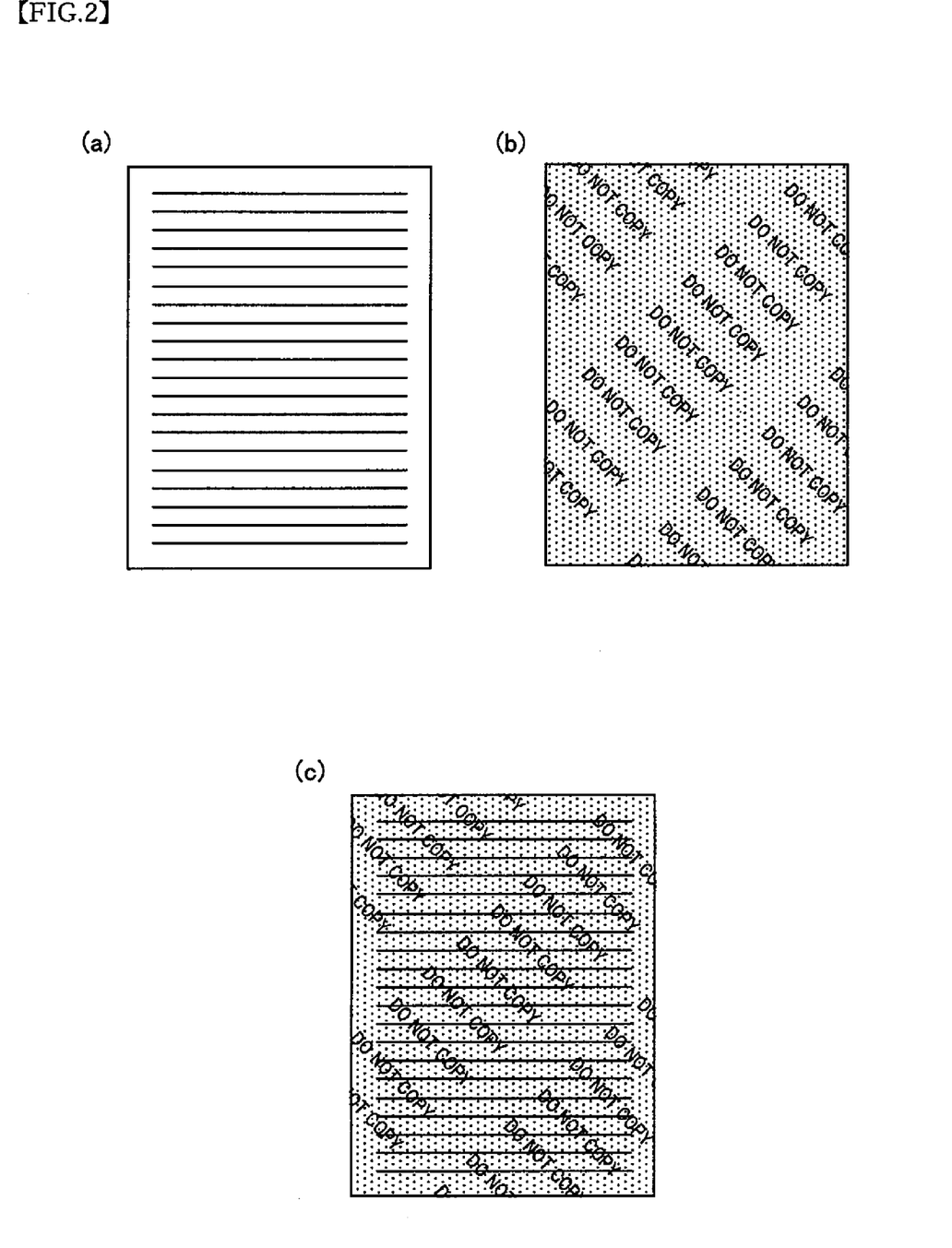
FIGS. 2A to 2C are diagrams illustrating a background image subjected to a copy-forgery-prohibited pattern image processing.

Alternatively, if the control unit 10 determines that the instruction to print the background image requests the execution of the copy-forgery-prohibited pattern image processing (YES in Step S55), the watermark pattern generating unit 105 generates the background image having the watermark pattern (S56). In other words, the watermark pattern generating unit 105 uses the dither pattern that is different from the other background part for the latent image part defining the watermark pattern in the background image, and sets the pattern density of one thereof to a pattern density exceeding the resolution used when the document reading unit 12 reads the document and the pattern density of the other to a pattern density equal to or lower than the resolution used when the document reading unit 12 reads the document, to thereby generate a background image embedded with the watermark pattern such as, for example, "DO NOT COPY" as illustrated in FIG. 2. Note that if the process of Step S54 has been performed, the watermark pattern generating unit 105 generates the watermark pattern in the background image having the recognition dot pattern designed to prohibit an image data outputting generated in Step S54.

Further, if the control unit 10 determines that the instruction to print the background image requests the execution of the recognition mark to cancel an image data outputting prohibition embedding process (YES in Step S57), the recognition mark to cancel an image data outputting prohibition generating unit 103 generates the background image having the recognition mark to cancel an image data outputting prohibition (S58). In other words, the recognition mark to cancel an image data outputting prohibition generating unit 103 embeds the recognition mark to cancel an image data outputting prohibition in the background image by replacing a part of the image data constituting the background image generated in Step S54 or S56 with the image data indicating the recognition mark to cancel an image data outputting prohibition.

Subsequently, the image generating unit 106 overlays the background image generated in Step S54, S56, or S58 onto the document image (S59). After that, the control unit 10 causes the image forming unit 16 to perform the image formation for the document image on which the background image is overlaid in Step S59 (S60).

Note that as the copy-forgery-prohibited pattern image and the recognition mark to cancel an image data outputting prohibition embedding process that suit the copy restriction process according to this embodiment, after the process of Step S60, the control unit 10 causes the control unit 10 or the storage unit 11 to store therein the time when the process of Step S60 is executed.

It should be noted that the present invention is not limited to the configurations of the above-mentioned embodiments, and various modifications can be made. For example, in the above-mentioned embodiments, in Step S58 of the copy-forgery-prohibited pattern image processing and the recognition mark to cancel an image data outputting prohibition embedding process illustrated in FIG. 6, by having image data on a plurality of recognition marks to cancel an image data outputting prohibition stored in the storage unit 11, the recognition mark to cancel an image data outputting generating unit 103 may use a different recognition mark to cancel an image data outputting prohibition each time the process of creating the recognition mark to cancel an image data outputting prohibition with the background image is performed (or use at least an recognition mark to cancel an image data outputting prohibition different from the previously-created one). Then, in the copy restriction process according to an embodiment of the present invention, the control unit 10 can permit the outputting of the document image when the most recently-embedded recognition mark to cancel an image data outputting prohibition is detected by the recognition mark to cancel an image data outputting prohibition detecting unit 102 from the document image. Accordingly, this can increase the ability to prevent, for example, an unauthorized third party from attempting to copy a document without limitation or pasting the recognition mark to cancel an image data outputting prohibition onto another image data.

Further, although the above-mentioned embodiments are described with respect to a copying machine, as an example of the image processing apparatus, other devices may be used, such as a personal computer. That is, when the user uses the personal computer to instruct a printer or the like connected to the personal computer to print image data, in the same manner as the control unit 10 of the copying machine 1, a control unit of the personal computer may function as the control unit 10, the dot pattern detecting unit 101, the recognition mark to cancel an image data outputting prohibition detecting unit 102, the recognition mark to cancel an image data outputting prohibition generating unit 103, the recognition mark to cancel an image data outputting prohibition generating unit 104, the watermark pattern generating unit 105, and/or the image generating unit 106 to perform print restriction on data to be printed according to the above-mentioned print instruction.

The embodiments of the present invention have been described above by referring to the drawings, but the present invention is not limited to the illustrated embodiments. Various modifications and changes can be made upon the illustrated embodiments within the same scope of the present invention or within the scope of equivalents.

The present invention may be summarized, in part, from the above-mentioned embodiments as follows.

Specifically, an image processing apparatus according to one embodiment of the present invention includes:

an image data acquiring unit for acquiring image data;

a dot pattern detecting unit for determining whether the image data acquired by the image data acquiring unit includes a predefined outputting prohibition dot pattern or not;

a recognition mark to cancel an image data outputting prohibition detecting unit for determining whether the image data acquired by the image data acquiring unit includes a predefined recognition mark to cancel an image data outputting prohibition or not; and a control unit for prohibiting outputting of the image data if the dot pattern detecting unit detects the recognition dot pattern designed to prohibit an image data outputting, and permitting the outputting of the image data if the recognition mark to cancel an image data outputting prohibition detecting unit detects the recognition mark to cancel an image data outputting prohibition.

Further, the image processing apparatus according to another embodiment of the present invention includes an image forming unit for performing image formation based on the image data acquired by the image data acquiring unit, in which the control unit permits the image forming unit to perform the image formation as the outputting if the recognition mark to cancel an image data outputting prohibition detecting unit detects the recognition mark to cancel an image data outputting prohibition.

Further, the image processing apparatus according to still another embodiment of the present invention includes a recognition dot pattern designed to prohibit an image data outputting creating unit for creating a background image having the recognition dot pattern designed to prohibit an image data outputting with the image data acquired by the image data acquiring unit.

Further, the image processing apparatus according to a further embodiment of the present invention further includes a watermark pattern creating unit for creating a background image having a predefined watermark pattern with the image data acquired by the image data acquiring unit.

Further, the image processing apparatus according to another embodiment of the present invention further includes:

a recognition mark to cancel an image data outputting prohibition creating unit for creating a background image having the recognition mark to cancel an image data outputting prohibition with the image data acquired by the image data acquiring unit; and an instruction inputting unit for allowing a user to input there through an instruction to execute a creating process for the background image having the recognition mark to cancel an image data outputting prohibition by the recognition mark to cancel an image data outputting prohibition creating unit, in which if the instruction to execute the creating process for the background image having the recognition mark to cancel an image data outputting prohibition is inputted through the instruction inputting unit, the control unit causes the recognition mark to cancel an image data outputting prohibition creating unit to perform the creating process for the background image having the recognition mark to cancel an image data outputting prohibition with respect to the image data acquired by the image data acquiring unit.

Further, in the image processing apparatus according to an embodiment of the present invention, the control unit limits the number of times the image can be inputted which the outputting is permitted if the recognition mark to cancel an image data outputting prohibition is detected, to a predefined number of times.

Further, in the image processing apparatus according to another embodiment of the present invention, the control unit limits the time period during which outputting is permitted, if the recognition mark to cancel an image data outputting prohibition is detected, to a predefined time period.

Further, in the image processing apparatus according to still another embodiment of the present invention, the recognition mark to cancel an image data outputting prohibition creating unit uses a different recognition mark to cancel an image data outputting prohibition for each time a creating process with respect to the image data is performed, and if the recognition mark to cancel an image data outputting prohibition that is most recently used for the creating process performed by the recognition mark to cancel an image data outputting prohibition creating unit is detected from the image data, the control unit permits the outputting of the image data.

Further, a computer-readable storage medium according to an embodiment of the present invention stores a program for causing a computer to function as:

a dot pattern detecting unit for determining whether image data acquired by an image data acquiring unit includes a recognition dot pattern designed to prohibit an image data outputting or not;

a recognition mark to cancel an image data outputting prohibition detecting unit for determining whether the image data acquired by the image data acquiring unit includes a predefined recognition mark to cancel an image data outputting prohibition or not; and a control unit for prohibiting outputting of the image data if the dot pattern detecting unit detects the recognition dot pattern designed to prohibit an image data outputting, and permitting the outputting of the image data if the recognition mark to cancel an image data outputting prohibition detecting unit detects the recognition mark to cancel an image data outputting prohibition.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus, comprising:
an image data acquiring unit for acquiring image data;
a dot pattern detecting unit for determining whether the image data acquired by the image data acquiring unit includes a predefined recognition dot pattern designed to prohibit an image data outputting or not;
a recognition mark to cancel an image data outputting prohibition detecting unit for determining whether the image data acquired by the image data acquiring unit includes a predefined recognition mark to cancel an image data outputting prohibition or not; and
a control unit for prohibiting outputting of the image data if the dot pattern detecting unit detects the recognition dot pattern designed to prohibit an image data outputting, and permitting the outputting of the image data if the recognition mark to cancel an image data outputting prohibition detecting unit detects the recognition mark to cancel an image data outputting prohibition.

2. The image processing apparatus according to claim 1, comprising an image forming unit for forming an image based on the image data acquired by the image data acquiring unit, the control unit permits the image forming unit to form the image as the outputting if the recognition mark to cancel an image data outputting prohibition detecting unit detects the recognition mark to cancel an image data outputting prohibition.

3. The image processing apparatus according to claim 1, comprising a recognition dot pattern designed to prohibit an image data outputting creating unit for creating a background image having the recognition dot pattern designed to prohibit an image data outputting with the image data acquired by the image data acquiring unit.

4. The image processing apparatus according to claim 3, comprising a watermark pattern creating unit for creating a background image having a predefined watermark pattern with the image data acquired by the image data acquiring unit.

5. The image processing apparatus according to claim 3, comprising:

a recognition mark to cancel an image data outputting prohibition creating unit for creating a background image having the recognition mark to cancel an image data outputting prohibition with the image data acquired by the image data acquiring unit; and an instruction inputting unit for allowing a user to input therethrough an instruction to execute a creating process for the background image having the recognition mark to cancel an image data outputting prohibition, if the instruction to execute the creating process for the background image having the recognition mark to cancel an image data outputting prohibition is inputted through the instruction inputting unit, the control unit causes the recognition mark to cancel an image data outputting prohibition creating unit to perform the creating process for the background image having the recognition mark to cancel an image data outputting prohibition with respect to the image data acquired by the image data acquiring unit.

6. The image processing apparatus according to claim 1, wherein the control unit limits a number of times outputting is permitted if the recognition mark to cancel an image data outputting prohibition is detected, to a predefined number of times.

7. The image processing apparatus according to claim 1, wherein the control unit limits a time period during which outputting is permitted if the recognition mark to cancel an image data outputting prohibition is detected, to a predefined time period.

8. The image processing apparatus according to claim 5, wherein:

the recognition mark to cancel an image data outputting prohibition creating unit uses a different recognition mark to cancel an image data outputting prohibition for each time a creating process with respect to the image data is executed; and if the recognition mark to cancel an image data outputting prohibition that is most recently used for the creating process executed by the recognition mark to cancel an image data outputting prohibition creating unit is detected from the image data, the control unit permits the outputting of the image data.

9. The non-transitory computer-readable storage medium for storing an operation control program for causing a computer to function as:

a dot pattern detecting unit for determining whether image data acquired by an image data acquiring unit includes a predefined recognition dot pattern designed to prohibit an image data outputting or not;

a recognition mark to cancel an image data outputting prohibition detecting unit for determining whether the image data acquired by the image data acquiring unit includes a predefined recognition mark to cancel an image data outputting prohibition or not; and a control unit for prohibiting outputting of the image data if the dot pattern detecting unit detects the recognition dot pattern designed to prohibit an image data outputting, and permitting the outputting of the image data if the recognition mark to cancel an image data outputting prohibition detecting unit detects the recognition mark to cancel an image data outputting prohibition.

* * * * *